(12) United States Patent
McCann et al.

(10) Patent No.: US 6,305,511 B1
(45) Date of Patent: Oct. 23, 2001

(54) PARKING BRAKING IN VEHICLES HAVING CONVENTIONAL BRAKING SYSTEMS

(75) Inventors: Denis John McCann; Andrew John Ward, both of South Wales (GB)

(73) Assignee: Meritor Heavy Vehicle Systems, LLC

( * ) Notice: Subject to any disclaimer, the term of this patent is extended or adjusted under 35 U.S.C. 154(b) by 0 days.

(21) Appl. No.: 09/425,438

(22) Filed: Oct. 22, 1999

(30) Foreign Application Priority Data

Oct. 24, 1998 (GB) .................................................. 9823202
Jul. 19, 1999 (GB) .................................................. 9916777

(51) Int. Cl.$^7$ ............................ B60T 13/68; B60T 17/16; B60T 13/74

(52) U.S. Cl. .................... 188/265; 188/31; 188/106 F; 188/162; 188/156; 303/89; 303/20; 303/13; 303/113.2; 303/191

(58) Field of Search ............................. 303/89, 191, 20, 303/13–18, 3, 2, 9, 113.3, 113.2; 188/60, 31, 353, 156–165, 1.11, 106 P, 106 F, 106 R, 106 A, 265, 162, 20; 92/27

(56) References Cited

U.S. PATENT DOCUMENTS

| | | | |
|---|---|---|---|
| 2,235,412 | * | 3/1941 | Weiss et al. .................... 188/265 |
| 3,684,049 | * | 8/1972 | Kimura .................................. 303/89 |
| 3,887,040 | | 6/1975 | Simon . |
| 4,175,646 | | 11/1979 | Eikelberger . |
| 4,400,039 | * | 8/1983 | Ogata ..................................... 303/3 |
| 4,677,420 | | 6/1987 | Topic . |
| 4,685,540 | | 8/1987 | Rath . |
| 4,804,073 | | 2/1989 | Taig . |
| 4,809,824 | | 3/1989 | Fargier . |
| 4,850,459 | | 7/1989 | Johannesen . |
| 4,995,483 | | 2/1991 | Moseley . |
| 5,050,938 | | 9/1991 | Brearley . |

| 5,127,495 | | 7/1992 | Verner et al. . |
|---|---|---|---|

(List continued on next page.)

FOREIGN PATENT DOCUMENTS

| | | |
|---|---|---|
| 4327759 | 7/1996 | (DE) . |
| 19620344 | 8/1997 | (DE) . |
| 19705105 | 8/1997 | (DE) . |
| 19653541 | 6/1998 | (DE) . |
| 19738877 | 9/1998 | (DE) . |
| 0789156 | 8/1997 | (EP) . |
| 995657 * | 4/2000 | (EP) . |
| 995659 * | 4/2000 | (EP) . |
| 0995922 | 4/2000 | (EP) . |
| 0995923 | 4/2000 | (EP) . |
| 359086723 | 5/1984 | (JP) . |
| 359145659 | 8/1984 | (JP) . |
| 4108058 | 4/1992 | (JP) . |
| 7257356 | 10/1995 | (JP) . |
| 7277157 | 10/1995 | (JP) . |
| 8127317 * | 5/1996 | (JP) . |
| 9221010 * | 8/1997 | (JP) . |
| 10024813 | 1/1998 | (JP) . |
| WO97/29292 | 8/1997 | (WO) . |
| WO97/29297 | 8/1997 | (WO) . |
| WO97/29298 | 8/1997 | (WO) . |
| WO99/38738 | 8/1999 | (WO) . |
| 9948738 * | 9/1999 | (WO) . |

OTHER PUBLICATIONS

Search Report, For PCT/GB99/00953.

*Primary Examiner*—Douglas C. Butler
(74) *Attorney, Agent, or Firm*—Carlson, Gaskey & Olds

(57) ABSTRACT

A parking braking system in a vehicle not having EBS wherein, for parking braking, the brakes are arranged to be supplied with actuating fluid from a pressure source under the control of a manually operated electrical device and wherein, upon selecting parking braking by actuation of the electrical device, the brakes are arranged to be applied and mechanically locked or latched in place.

24 Claims, 12 Drawing Sheets

U.S. PATENT DOCUMENTS

| | | |
|---|---|---|
| 5,148,894 | 9/1992 | Eddy . |
| 5,158,160 | 10/1992 | Doell . |
| 5,161,650 | 11/1992 | Taig . |
| 5,310,251 * | 5/1994 | Towers et al. . |
| 5,348,123 | 9/1994 | Takahashi . |
| 5,370,449 * | 12/1994 | Edelen et al. . |
| 5,410,293 | 4/1995 | Angerfors . |
| 5,775,448 | 7/1998 | Hirahara . |
| 5,788,023 | 8/1998 | Shoner . |
| 5,807,205 | 9/1998 | Odaka . |
| 5,848,672 | 12/1998 | Brearley . |
| 5,949,168 | 9/1999 | Dieckmann . |
| 5,954,162 * | 9/1999 | Feigel et al. .................... 188/265 |
| 5,957,246 | 9/1999 | Suzuki . |
| 5,975,250 | 11/1999 | Brandmeier . |
| 5,988,773 | 11/1999 | Sawada . |
| 6,000,507 | 12/1999 | Bohm . |
| 6,003,640 | 12/1999 | Ralea . |
| 6,012,556 | 1/2000 | Blosch . |
| 6,016,694 | 1/2000 | Decker . |
| 6,129,183 | 10/2000 | Ward . |
| 6,139,117 | 10/2000 | Shirai . |

* cited by examiner

RELEASED

PARK APPLIED & LATCHED

ACTUATOR EXHAUSTED
PARK HELD

LATCH UNLOADED
PARK RELEASED

PARKING BRAKING IN VEHICLES HAVING CONVENTIONAL BRAKING SYSTEMS

The present invention relates to parking braking in vehicles having conventional braking systems, ie. braking systems not of the type having so-called Electronic Braking (EBS). In conventional braking systems, there is a mechanical (including pneumatic/hydraulic) coupling between the brake pedal and the brakes, usually a hydraulic or pneumatic coupling. In EBS systems, there is no mechanical coupling between the brake pedal and the brakes, the brakes being applied via modulators which are operated via electrical signals generated in response to actuation of the brake pedal and controlled by a microcomputer.

The conventional approach to parking brakes in conventionally braked vehicles is, in the case of hydraulically operated brakes, to provide a mechanical linkage operated by a hand-brake lever which operates the brakes directly. In the case of pneumatically operated brakes, the conventional approach is to release air pressure from spring brake actuators to allow the spring forces to apply to brakes.

In our earlier unpublished applications nos. UK 9806544.4 and PCT/GB99/00953, we have described means by which parking braking can be integrated into Electronic Braking systems (EBS). The described proposals utilise the EBS, under the control of a hand-operated parking control, to apply the brakes to a desired level, which are then mechanically latched in place to maintain that desired level for parking purposes.

The present invention is concerned with the application of parking braking of this type to vehicles that do not have EBS.

In accordance with the present invention, there is provided a parking braking system in a vehicle not having EBS wherein, for parking braking, the brakes are arranged to be supplied with actuating fluid from a pressure source under the control of a manually operated electrical device and wherein, upon selecting parking braking by actuation of the electrical device, the brakes are arranged to be applied and mechanically locked or latched in place.

In some embodiments, use is made of the pressure source provided already for traction control for the supply of actuating fluid to apply the parking braking.

Most modern vehicles are equipped with an antilock braking system (A.B.S.) and increasingly, a traction control system (known typically as ASR) is also provided. ASR includes valving that is able to apply the brakes of the driven wheels independently of the foot brake control. This is used in conjunction with the ABS valves to arrest the motion of a spinning drive axle wheel. Via the differential, it is then possible to drive the vehicle forward utilising the non-spinning wheel. Advantageously, such valving can be used to apply and regulate the braking for parking, in much the same way that is proposed with the EBS based parking system in our abovementioned earlier patent applications.

If ASR is not available on a vehicle, then dedicated valving is provided, together with a suitable pressure source, to apply the brakes to a desired parking braking level prior to application of the mechanical lock or latch to maintain that parking braking level.

By providing such a mechanical latch or lock, the braking force applied to the brake actuators can be released/removed once the latch or lock has been actuated to hold the brakes in the brakes-applied condition.

In some embodiments, the manually operated electrical device is adapted to generate and transmit to a parking braking ECU an electrical parking braking signal, the vehicle brakes being arranged to be mechanically locked or latched via the parking braking ECU in a brakes-applied condition in response to the generation of said electrical parking brake signal.

In some embodiments, the manually operated electrical device is adapted to generate and transmit to a vehicle mounted ECU an electrical parking brake signal, the vehicle brakes being arranged to be mechanically locked or latched via said vehicle mounted ECU in a brakes-applied condition in response to the generation of said electrical parking brake signal.

In some embodiments the manually operated electrical device comprises a switch.

In some other embodiments, the manually operated electrical device comprises a variable transducer.

The variable transducer can be adapted to enable graduated braking to be provided between the brakes-off and park positions.

Preferably, the brake actuators are arranged to be released once the latch or lock has been actuated to hold the brakes in the brakes-applied condition.

Advantageously, following actuation of the manually operable electrical device, the initiation of the latching action is provided by a feedback quantity, taken from the sensed actuation level being exerted in the brake, reaching a preset or controlled level.

In some embodiments, the feedback quantity is the pressure developed inside the brake actuator against the internal brake forces being developed within the brake.

In some other embodiments, the feedback quantity is the displacement of a component within the brake actuation mechanism. In still further embodiments, the feedback quantity is the force developed inside the brake, measured by a sensor or sensors positioned so as to be subjected to the actuation/clamping stresses within the brake.

Advantageously, the mechanical latch/lock comprises a stop device which, when actuated, moves into a position to mechanically hold the brake in a parking braking condition, irrespective of whether the brake force generated is then reduced.

In some embodiments, the stop device is a solenoid operated pin.

In some other embodiments, the stop device comprises a pivotable latch which is selectively rotatable by an actuator for single position engagement with an operating or input lever or shaft of the brake to maintain the brake in the parking braking condition.

Preferably, the stop device is constructed so as to be capable of mechanically holding the brakes in any of a range of park load levels.

In some embodiments, the stop device comprises a pivotable latch which is selectively rotatable by an actuator to any of a plurality of engagement positions with an operating or input lever or shaft of the brake to maintain the brake in a selected parking braking condition.

In other embodiments, the stop device comprises a rotatable cam which engages an operating or input lever or shaft of the brake for maintaining the brake in a selected parking braking condition.

In still other embodiments, the stop device comprises a wedge which is arranged to be selectively driven by a controlled actuator into engagement with an operating or input lever or shaft of the brake to maintain the brake in a selected parking braking condition.

Preferably, the controlled actuator is an air cylinder or an electric motor.

Advantageously, the wedge is coupled to the electric motor by way of a mechanism which is non-reversible except by reverse driving of the motor.

Advantageously, said non-reversible mechanism is a high reduction gearbox.

Preferably, in order to enable parking braking to be released, the brake force is arranged to be re-applied up to a level at which the brake latch or lock can be released.

In some embodiments as described above, following selection of a parking braking release condition of said manually operated electrical device, initiation of release of the latching action is arranged to be dependent upon the aforementioned feedback quantity.

Using parking braking systems in accordance with the present invention, it is possible to emulate the principal features of conventional pneumatically controlled spring brakes, including the ability to modulate the amount of braking.

Using a single point latch arrangement which clamps the parking brake at a fixed position cannot take account of the variance in such brake condition tolerances as brake running clearance, new or worn linings and lining compressibility, without the possibility of overselling the clamp load. A system in accordance with embodiments of the present invention having a variable park latch arrangement can seek to overcome this problem by determining the level at which the park brake should be latched, driving the brake to a prescribed level and then locking the brake at the desired level.

Particularly, although not exclusively, with embodiments using a cam or wedge, the present system has the ability to enable different park load levels to be accommodated through the use of the variable latch mechanism.

Even with the additional components required within the system, the use of the invention can enable a valuable reduction in the complexity of the parking system which gives both component and installation cost benefits.

The invention is described further hereinafter, by way of example only, with reference to the accompanying drawings, in which.

Figure 6:
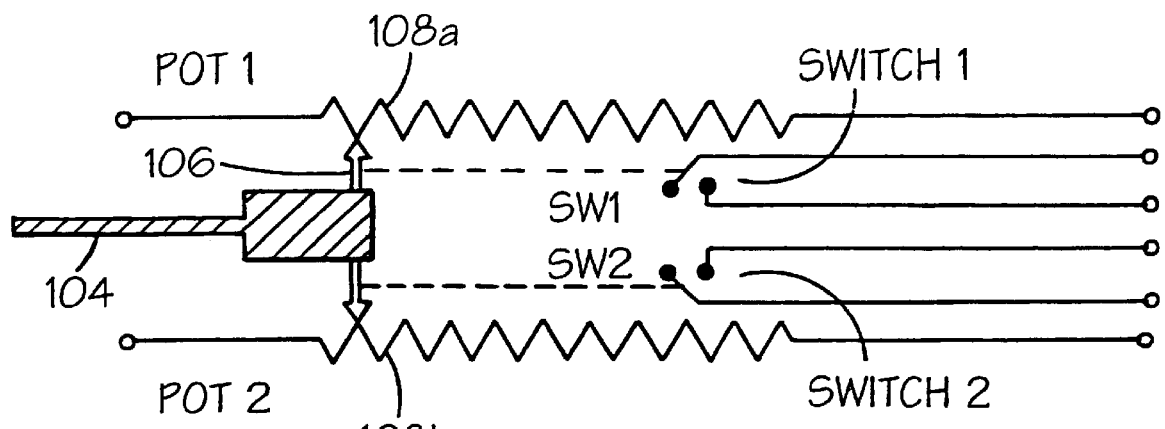
Figure 7:
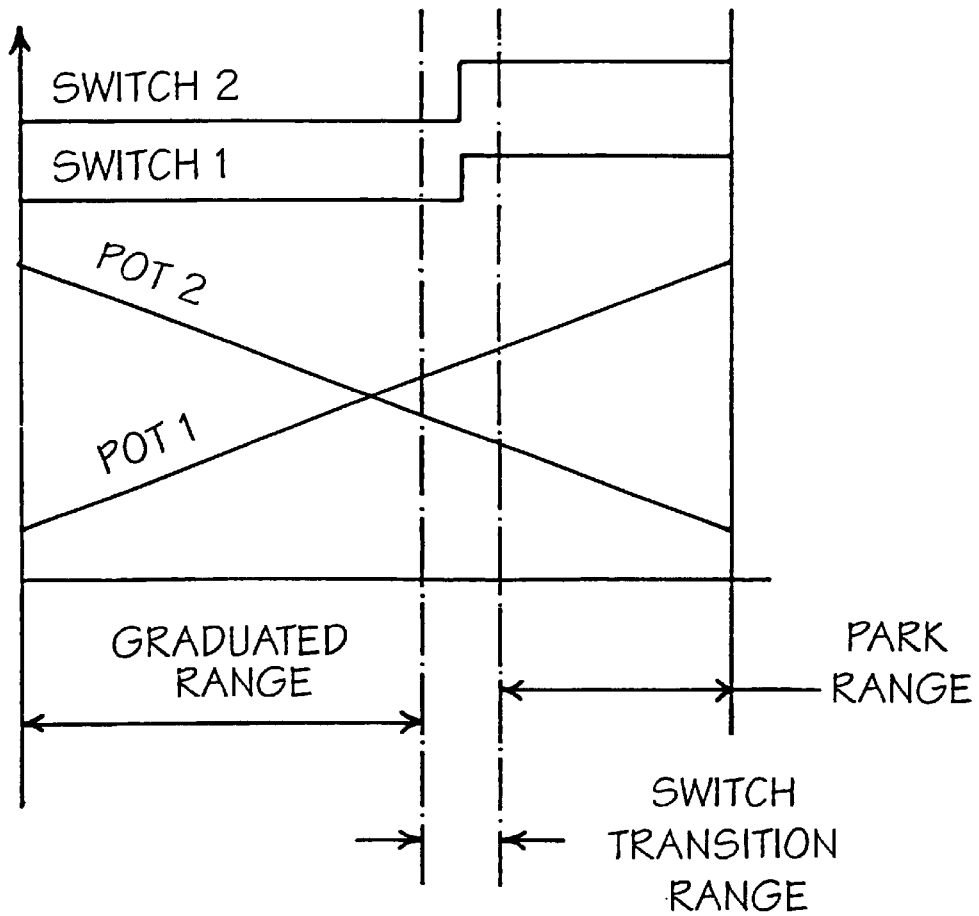
Figure 8:
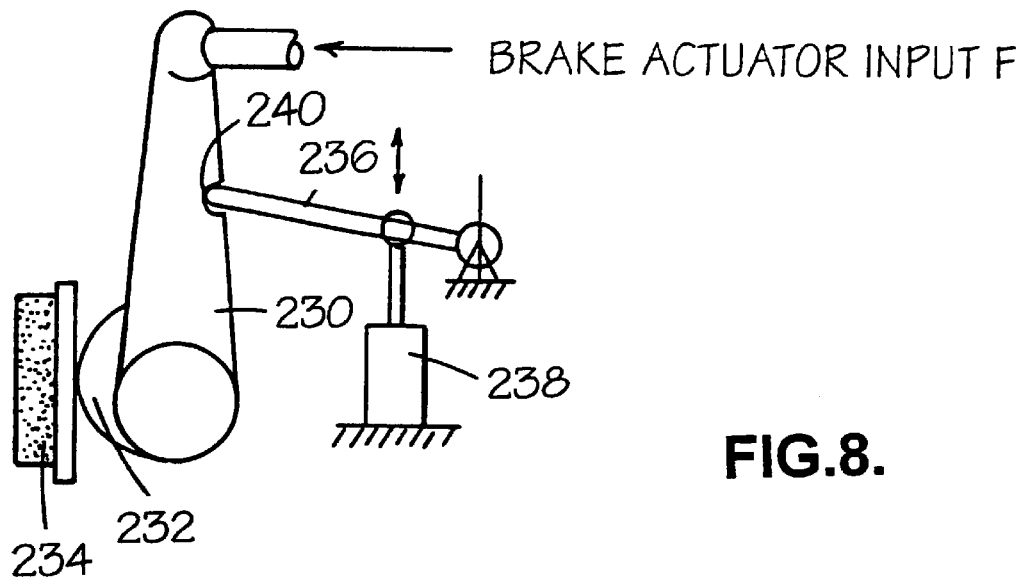
Figure 9:
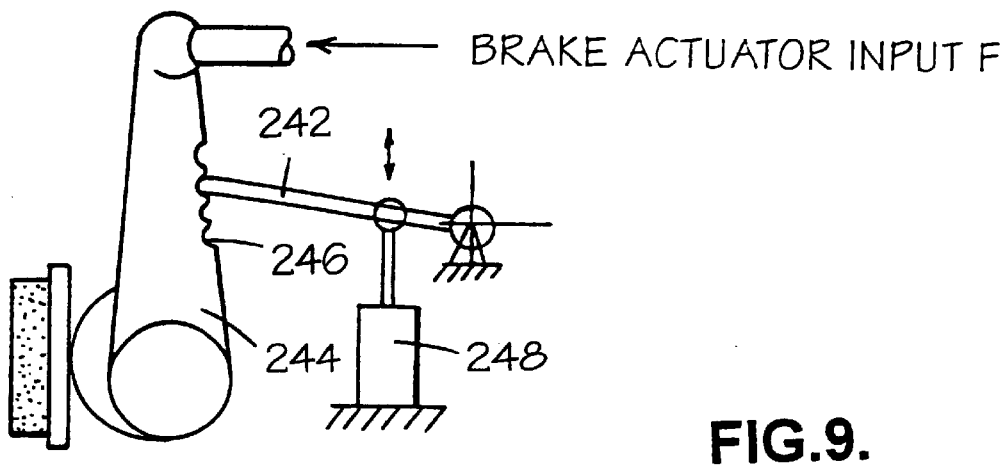
Figure 10:
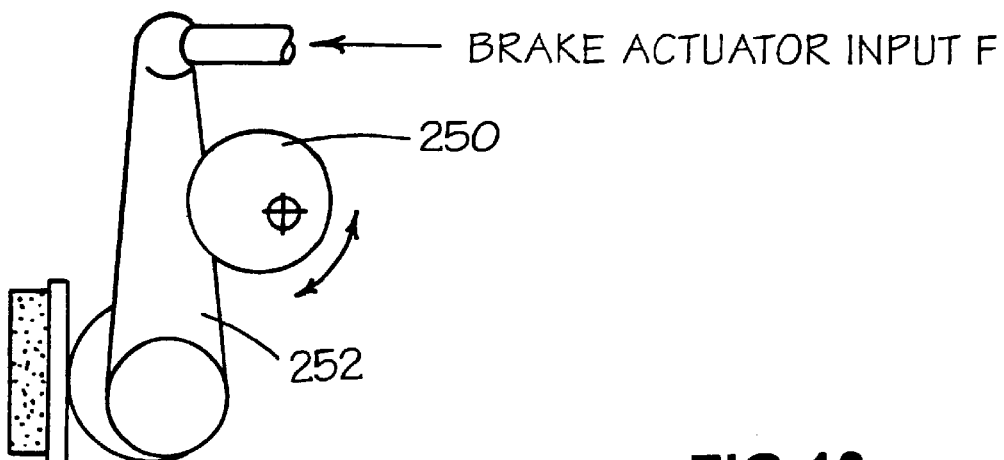
Figure 11:
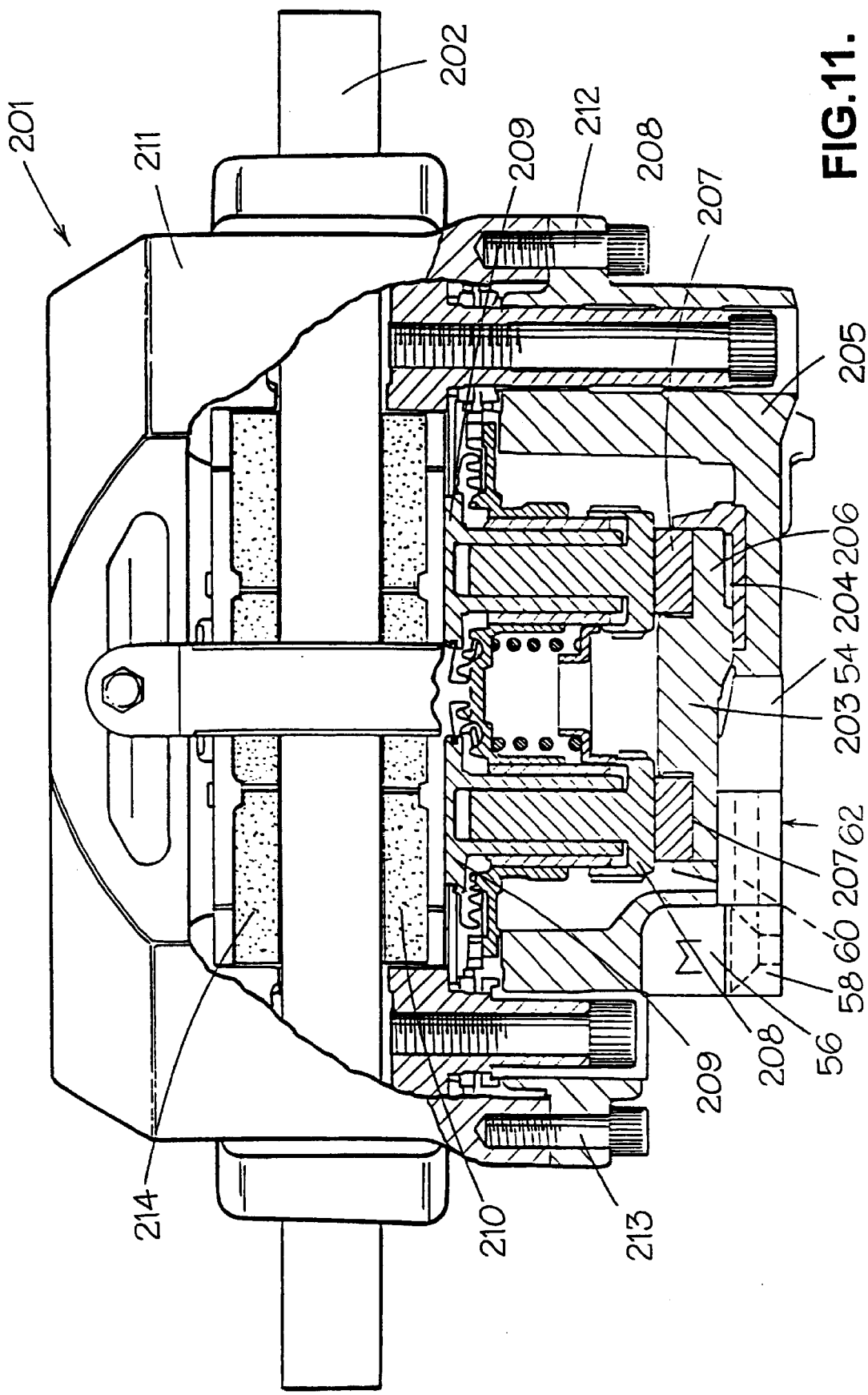
Figure 12:
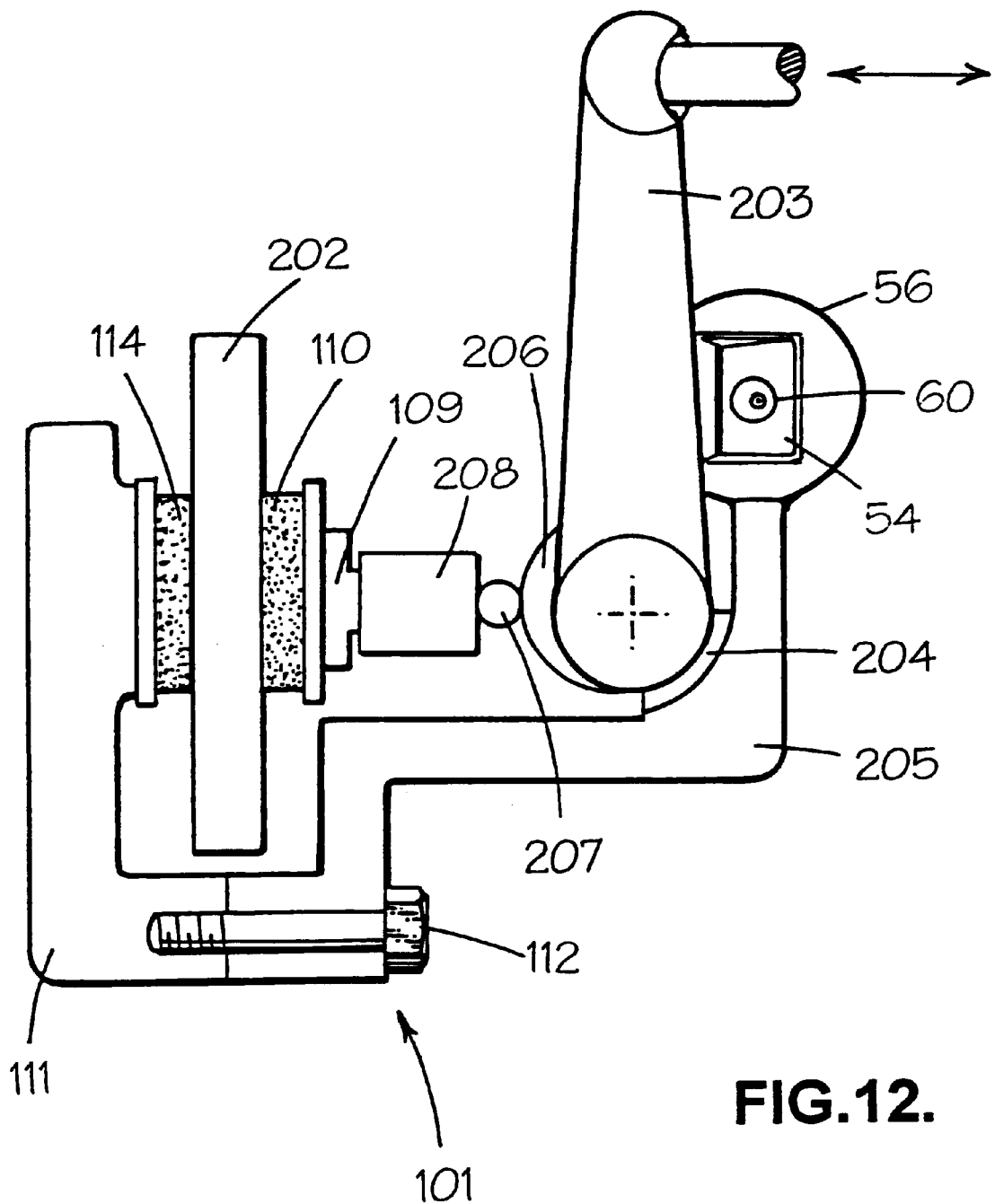
Figure 13:
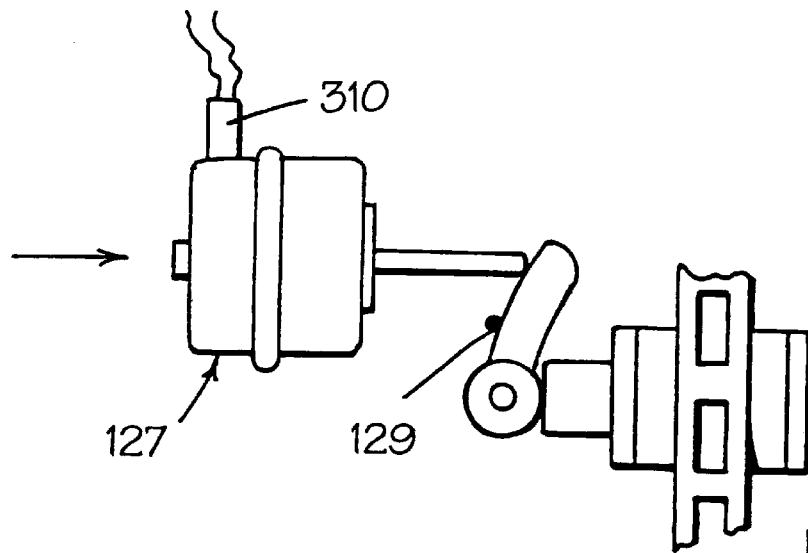
Figure 14:
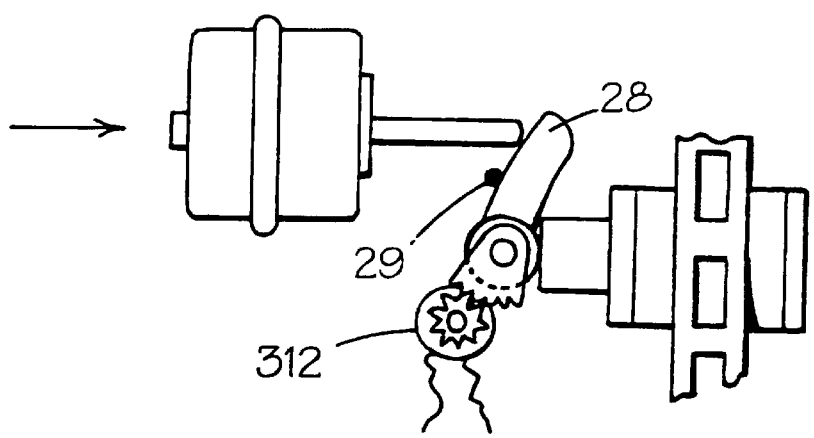
Figure 15:
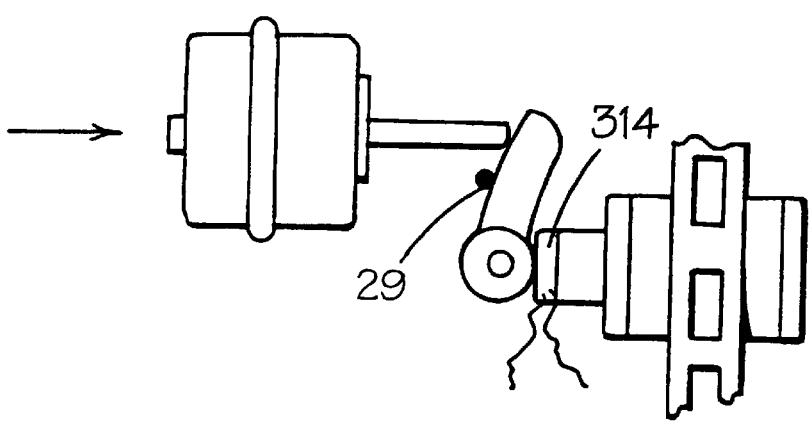
Figure 16:
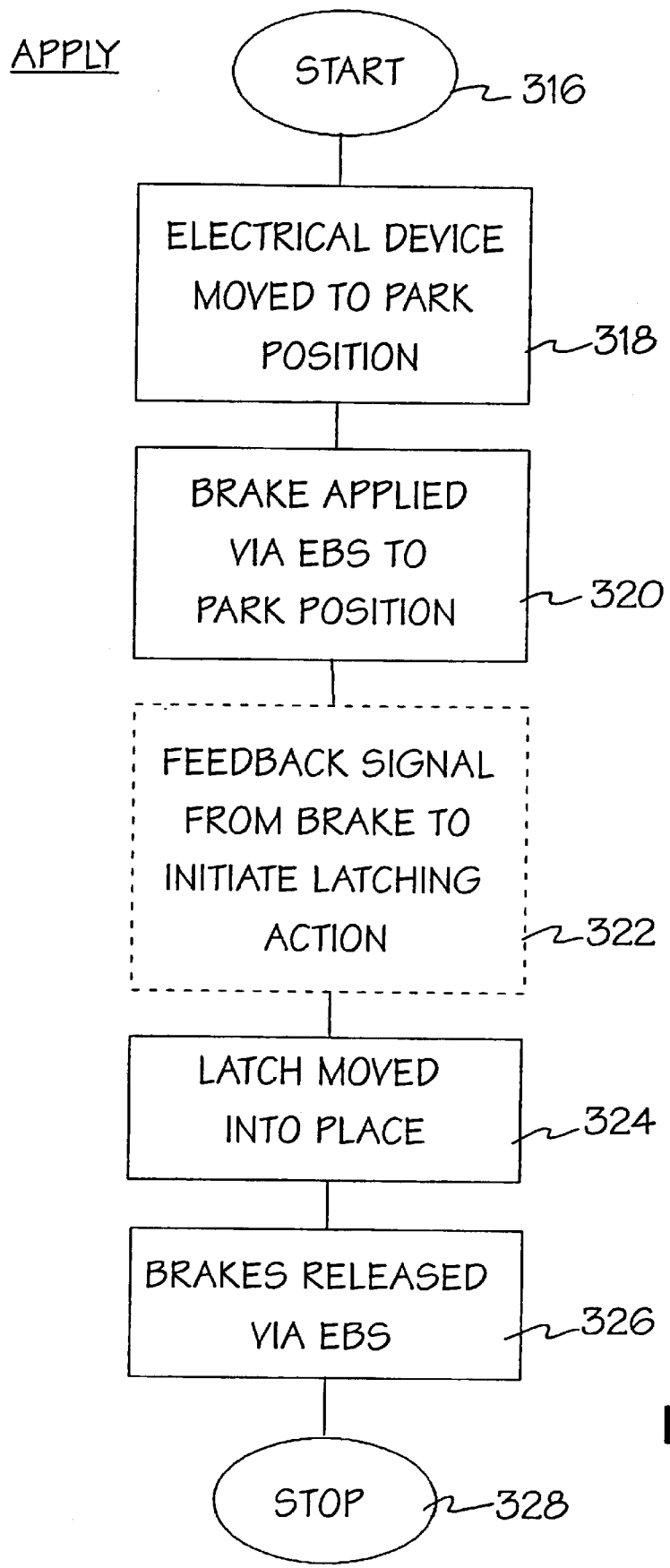
Figure 17:
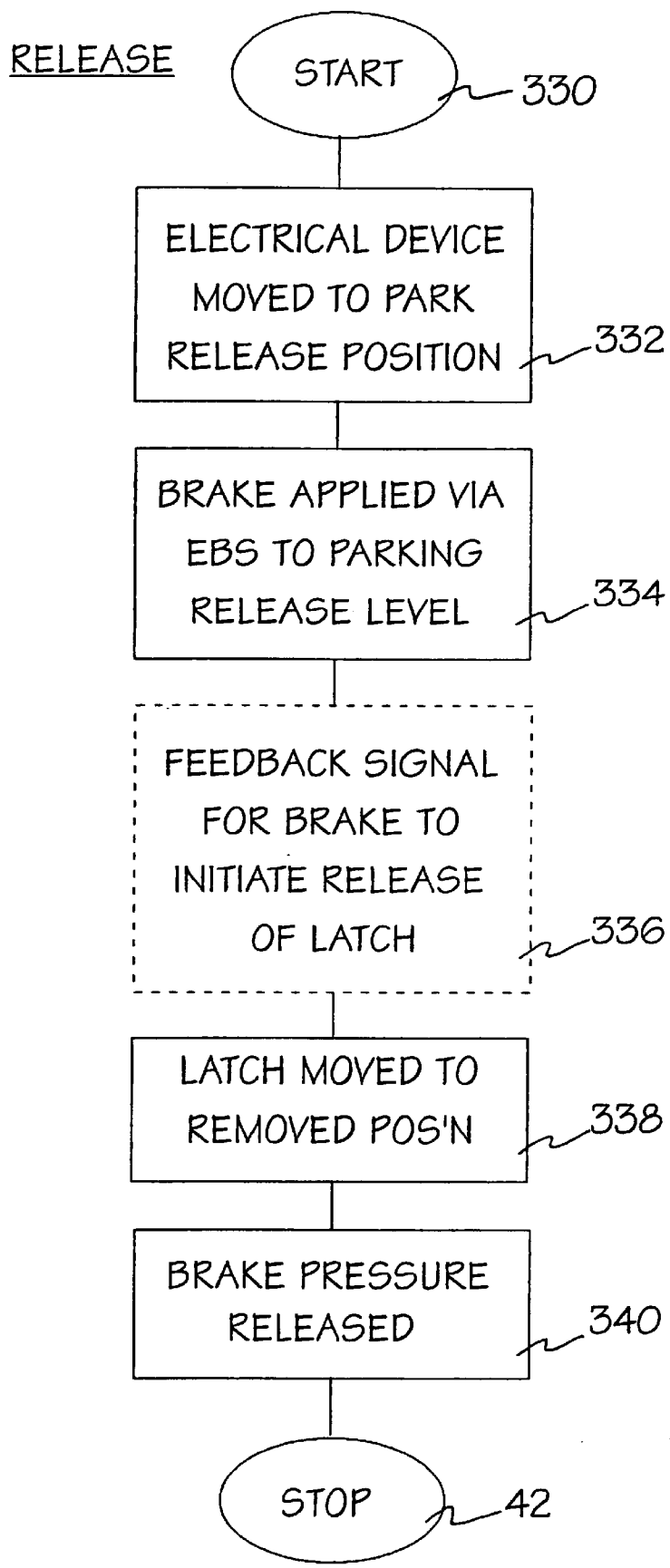

FIGS. 5, 5(a), 5(b), 5(c) and 5(d) are a set of diagrams (a–d) illustrating an embodiment of a parking brake system in accordance with the present invention;

FIG. 6 illustrates diagrammatically an embodiment of a manually operated electrical device for use in the invention;

FIG. 7 is a diagram illustrating the operation of the electrical device of FIG. 6;

FIG. 8 is a diagrammatic illustration on a non-variable position park latch device;

FIGS. 9 and 10 are diagrammatic illustrations of first and second variable position park latch devices in accordance with the present invention;

FIG. 11 is a sectional view through a braking device fitted with a variable latching device in accordance with the present invention;

FIG. 12 illustrates the principle of operation of the latching device of FIG. 11;

FIGS. 13, 14 and 15 illustrate diagrammatically various means of obtaining a feedback quality; and FIGS. 16 and 17 are flow diagrams illustrating possible sequences for the application and release of parking braking in a system in accordance with the present invention.

Figure 1:
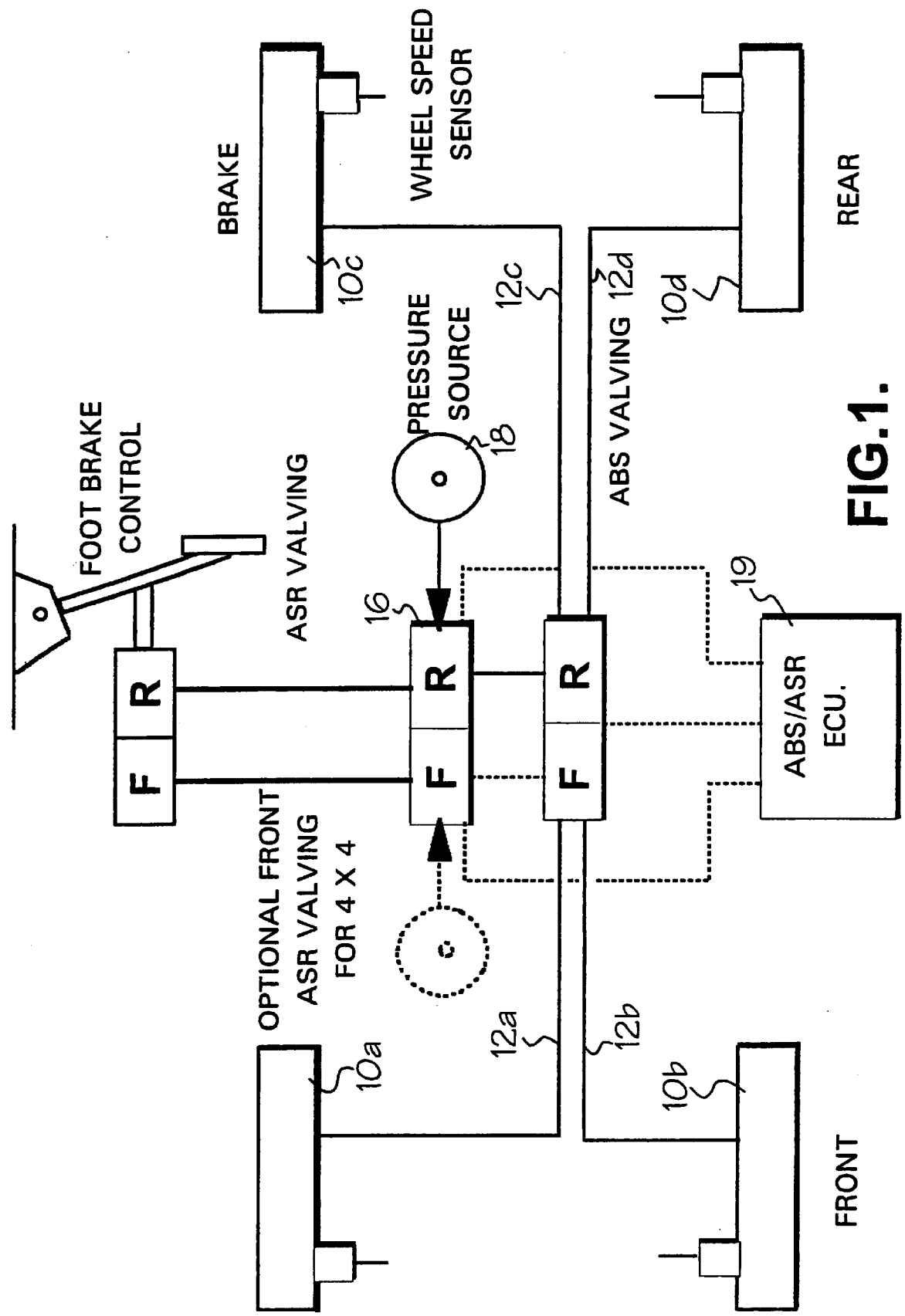
FIG. 1 is a block diagram of a conventional braking system in a typical 4×2 vehicle having hydraulically/pneumatically actuated brakes.

FIG. 1 shows a basic block diagram of a conventional braking system in a typical 4×2 vehicle which has a hydraulically or pneumatically actuated braking system equipped with ABS and ASR. For simplicity, only the main components are illustrated; the ABS and ASR valving need not be together in units, but could be separated and positioned to be close to the controlled axle. The system illustrated has a typical front/rear split, in that the controls for the front and rear axles are in separate channels marked F (front) and R (rear), respectively. The front wheel brakes 10a, 10b and rear wheel brakes 10c, 10d are operated via respectively hydraulic/pneumatic lines 12a–12d which incorporate ABS valving 14. ASR valving indicated at 16 is shown in this case to be acting only on the rear driven axle, but for 4-wheel drive vehicles it is possible for this to be installed in the front circuit, as shown in broken lines in FIG. 1. The ASR is powered by a pressure source 18. The ABS and ASR are controlled by an ABS/ASR electronic control unit (ECU) 19.

Figure 2:
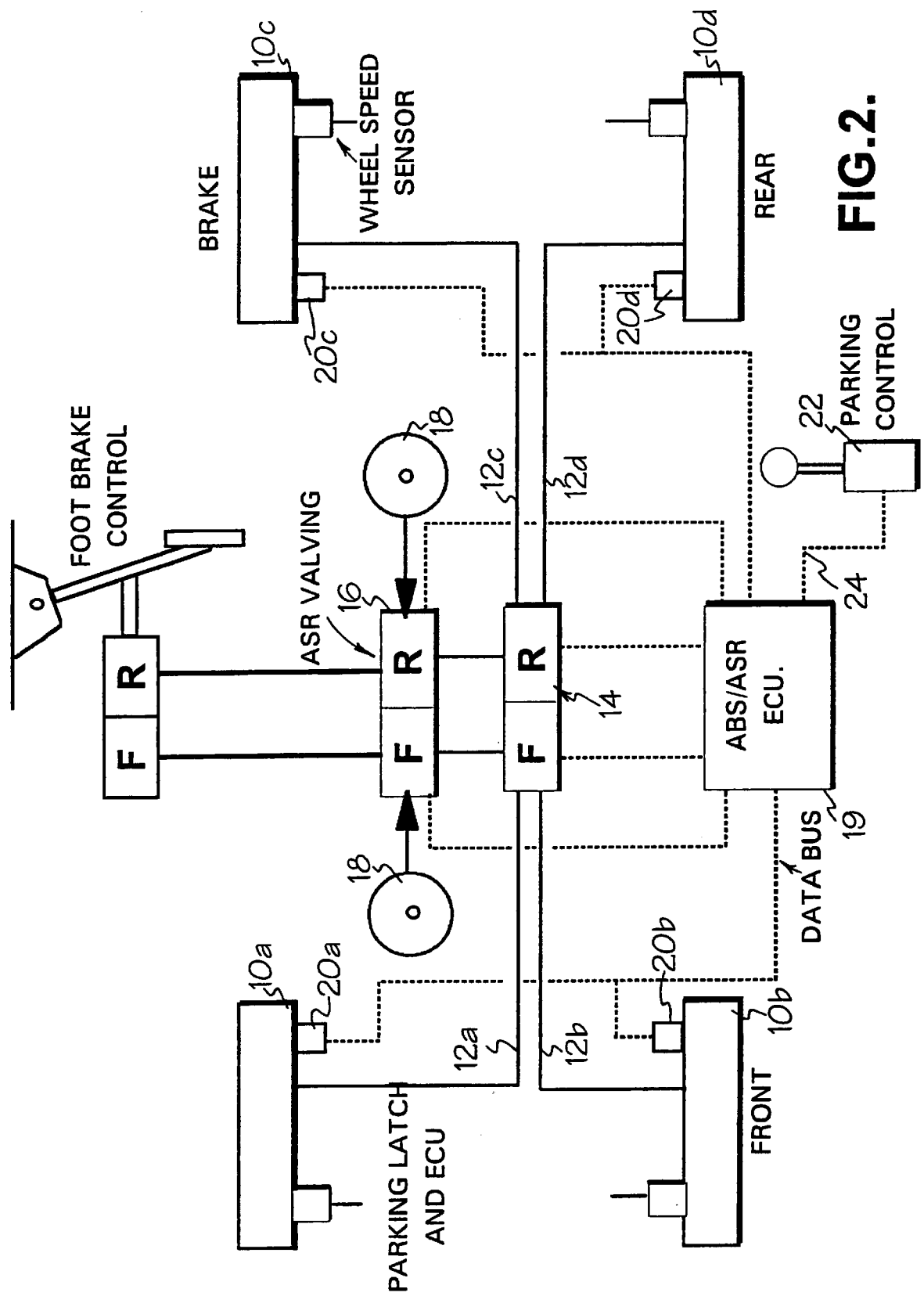
FIG. 2 shows one means by which a parking braking facility in accordance with the present invention can be integrated into the system of FIG. 1.

FIG. 2 shows one means by which a parking braking facility can be integrated within the conventional system of FIG. 1 in accordance with one aspect of the present invention. Each brake 10a–10d is provided with a parking latch and electronic control unit (ECU), as indicated at 20a–20d respectively, which are connected to the ABS/ASR ECU 19 over the system data bus. Parking braking is controlled via an electrical hand control 22 which feeds an electrical parking braking demand signal to the ABS/ASR ECU 19 via a line 24.

Operation of the hand lever 22 causes the ABS/ASR ECU 19 to operate the ASR valving 16 to enable pressure from the ASR pressure source 18 to apply the rear brakes 10c and 10d (in the case of ASR on the rear wheels only) or all brakes if the vehicle has ASR on all four wheels. Once the brakes have been applied up to a desired level, the ABS/ASR ECU 19 triggers the parking latches 20a–20d via the local parking latch ECUs to maintain that braking level for as long as parking braking is required. When parking braking is to be removed, the parking latches are arranged to be released, via the local ECUs and the ECU 19.

Figure 3:
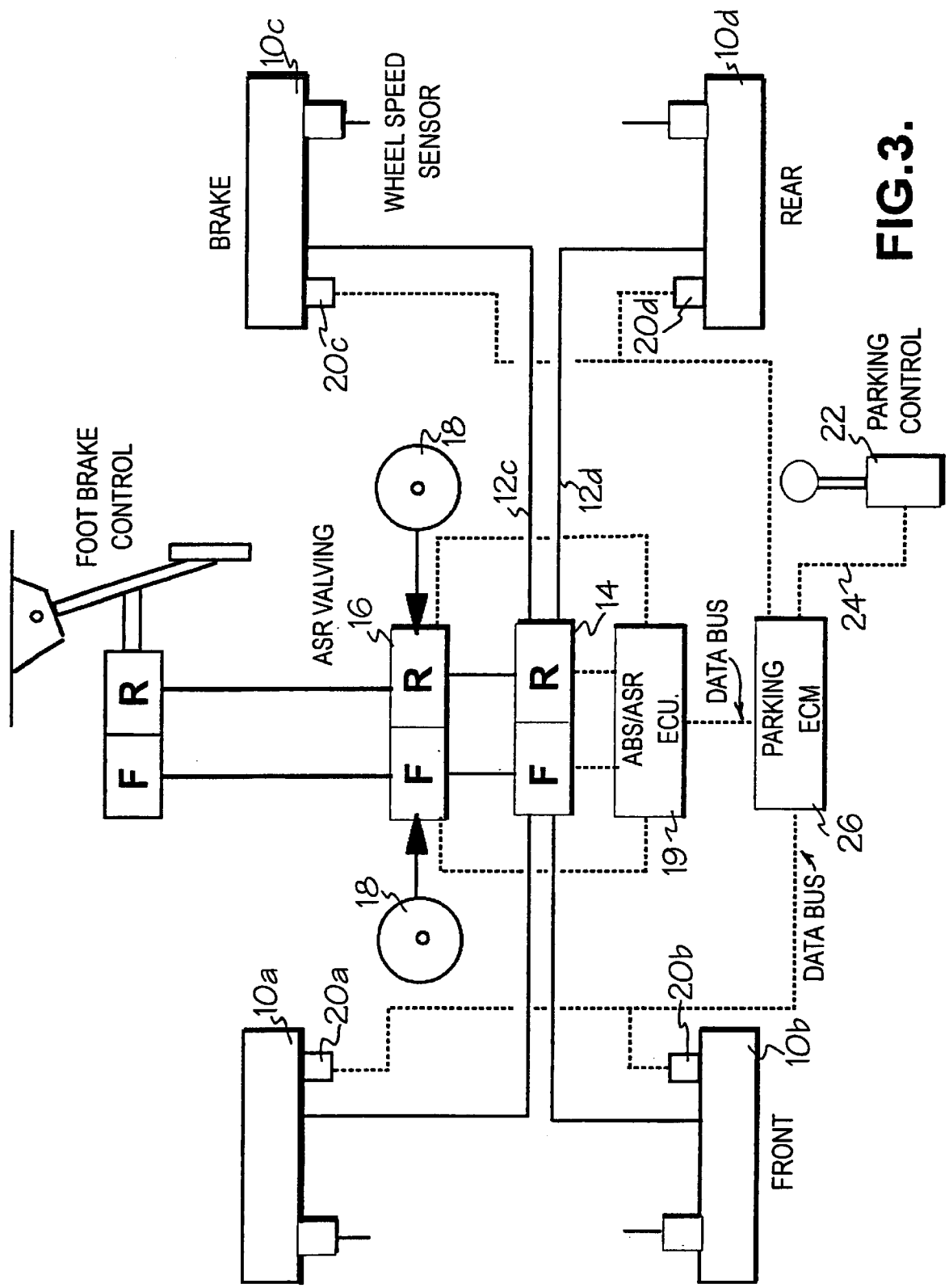
FIG. 3 shows another possibility utilising an additional parking ECU.

FIG. 3 shows another possibility wherein, by providing an additional parking ECU 26, the need for hardware modifications to be made to the ABS/ASR ECU 19 is avoided, although this would not be the lowest cost solution.

Figure 4:
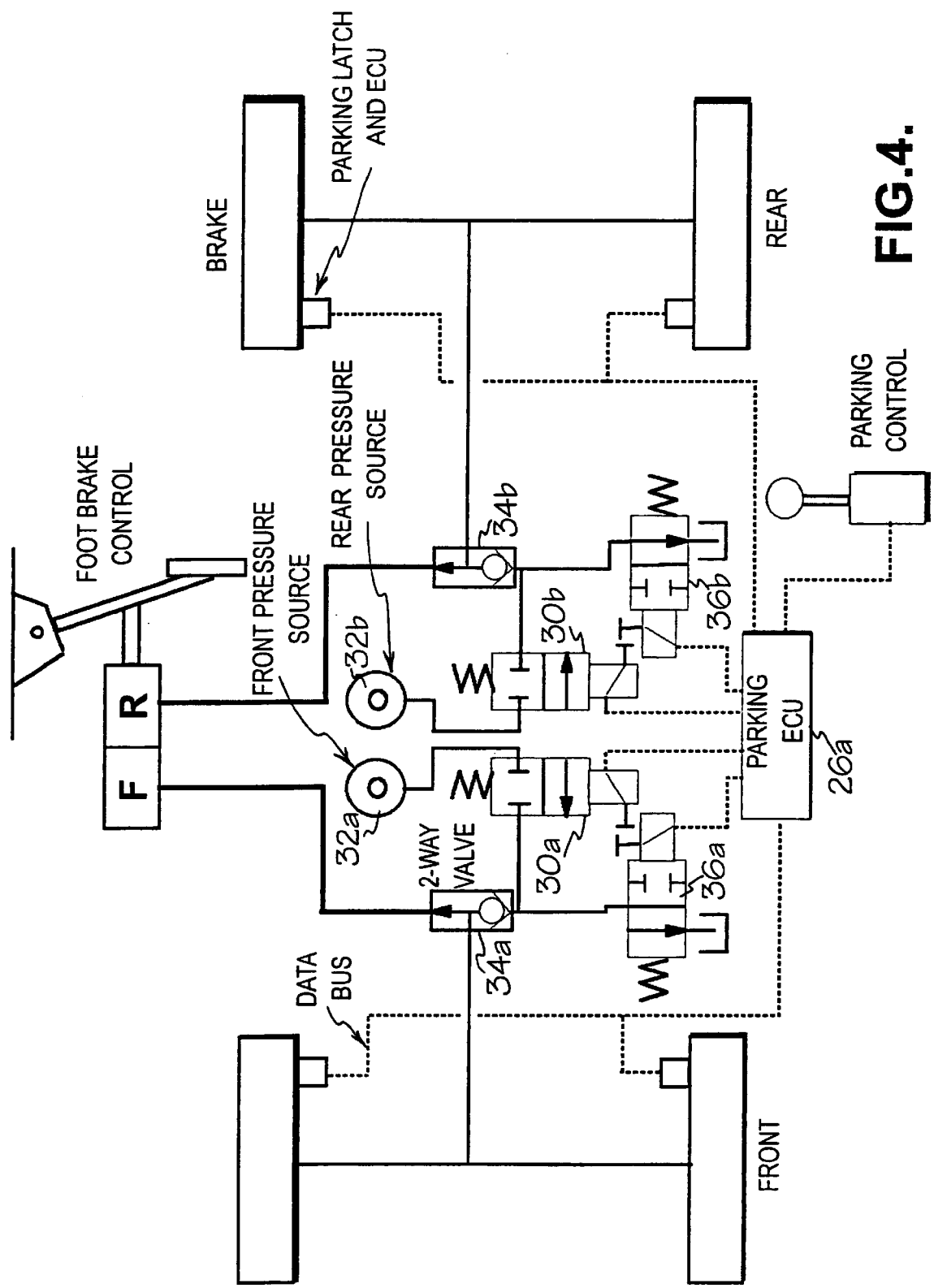
FIG. 4 shows an embodiment within a system not fitted with ABS/ASR.

FIG. 4 shows a block diagram of a basic system of a vehicle that does not have ABS/ASR and is therefore fitted with additional dedicated valving and a parking ECU 26a. The valving for each of the front and rear channels includes a solenoid controlled two-position changeover valve 30a/30b controlled by the parking ECU 26a and which, in one position, blocks off the output from a pressure source 32a/32b, and in the other position allows pressure from the pressure source 32a/32b to be passed to a respective two-way valve 34a/34b and thence to the front/rear brakes for application of the parking brakes. Pressure applied to the brakes can be released by further solenoid controlled valves 36a/36b under the control of the parking ECU. In the parking brakes applied condition, the parking latch can be applied as described above in connection with FIG. 2.

Thus, the valving shown by way of example in FIG. 4 allows pressure to be fed to each of the axles independently, preserving the normal front/rear system split. The normally open (NO) and normally closed (NC) solenoid valves 30, 36, which are connected to the main brake circuit via the two-way valves 34, permit pressures of varying levels to be built, held and released.

Other valving arrangements are possible, such as combining the NO and NC solenoid valves into a 3-position valve with all ports closed in the middle position or by using a proportional solenoid valve.

If the pressure source used is independent of the front and rear sources, it is possible to apply parking braking on one axle only. In this case, only half of the parking valving shown in FIG. 4 would be used, typically applied to the drive axle only.

The arrangement shown in FIGS. 2 to 4 can be applied equally to hydraulically or pneumatically actuated braking systems.

Turning now to the parking latch mechanism and operation, many possibilities are available, some of which are described hereinafter by way of example.

Figure 5A:
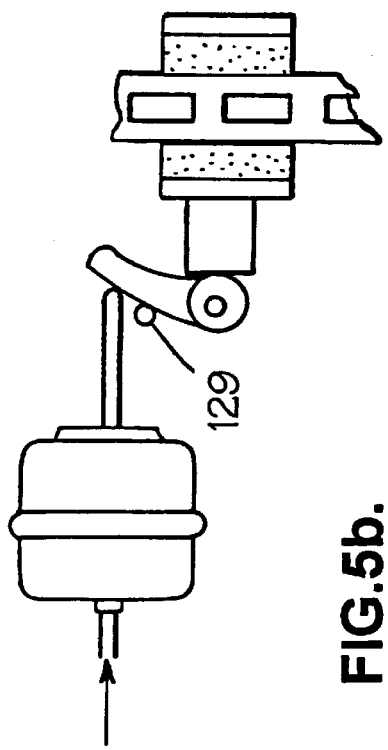
Figure 5B:
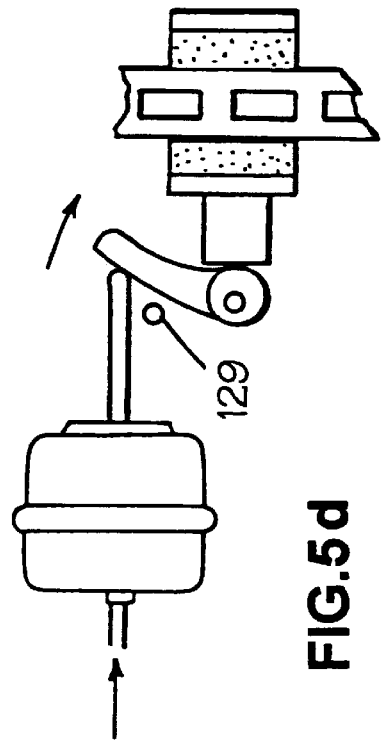
Figure 5C:
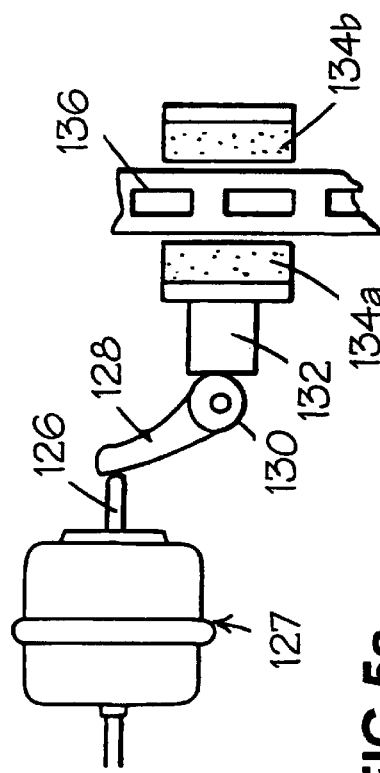
Figure 5D:
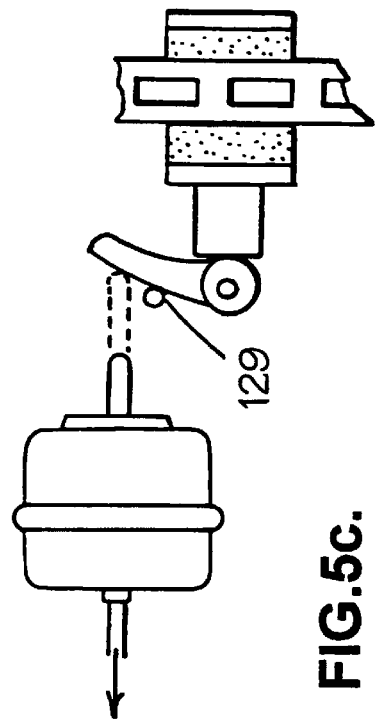

In the embodiment illustrated in FIGS. 5a–5d, each wheel brake actuator 127 includes a pneumatically operated piston 126 which, when any kind of braking (normal braking or parking braking) is demanded, rotates a pivoted lever 128 (referred usually as the operating shaft or op shaft) clockwise (as viewed in FIG. 5) so as to correspondingly rotate a cam 130 to urge a brake piston 132 to the right and apply brake pads 134a, 134b to the two sides of a brake disc 136. Release of the piston 126 to the left allows the lever 128 to be returned anti-clockwise by a spring (not shown) to release the brake pads 134a, 134b. In the event that parking braking is demanded by operation of the hand control 22 and the lever 128 has been rotated clockwise to a parking braking level, the latch mechanism in the form of a solenoid controlled pin 129 is arranged to be operated to bring this pin into a position behind the lever 128, as shown in FIG. 5b, where it prevents the lever 128 from returning anti-clockwise when the pneumatic actuator is exhausted (FIG. 5c). The parking brake is thereby held on until the hand control 22 is operated to release the parking brake, at which time the lever 128 is moved slightly clockwise to a level which is usually (but not necessarily) at least and possibly slightly more than the load that was required to park the brake to release the contact pressure with the pin 129 and the pin is arranged to be withdrawn to enable normal foot braking to be resumed. In some circumstances, the level can be less than the level that was required to park the brake, for example after thermal contraction of the braking components.

The brakes preferably have local ECUs installed, connected to the parking ECU or ABS/ASR ECU data bus. These local ECUs contain the drivers for the latching mechanisms.

To ensure that the integrity of the system is maintained, the parking function is preferably provided on at least two vehicle axles that are each controlled by discrete parts of the braking system, such as the front and rear circuits in a vertically split system.

The hand control 22 works as a demand sensor, much the same as that installed in an EBS foot controlled valve. In practice, the logic would preferably be arranged such that whichever channel sets the higher demand would win. When the control is moved to the park position, the brakes are actuated to a parking level pressure, that is sufficient to provide the parking brake forces necessary to at least meet the requirements of the braking regulations. Once the latch is in place, the parking ECU releases the braking pressure.

Referring now to FIGS. 6 and 7, there is shown diagrammatically in FIG. 6 one possible embodiment of the hand control 22. This comprises a hand-operated lever 104, displacement of which correspondingly displaces a ganged slider 106 over two potentiometer tracks 108a, 108b from a "brakes" off position at the left-hand end to a "parking brake on" position adjacent the right-hand end. When the slider reaches the "parking brake on" position, it operates a pair of switches SW1 and SW2 which provide electrical signals for use in initiating the operation of the parking brake latches. The electrical operation of the device of FIG. 6 is illustrated in FIG. 7.

Up to the point where the switches are operated, the potentiometers 108a, 108b enable the provision of gradual application of the foundation brakes as described hereinbefore.

FIG. 8 shows an embodiment using a non-variable latch wherein a brake actuator input force F rotates a lever 230 (op shaft) carrying a cam 232 for urging a brake pad 234 against a brake disc for normal, non-parking braking purposes. In order to enable the brakes to be retained in a brakes-applied condition for parking braking, a pivotable latch pin 236 can be rotated by an actuator 238 so as to engage in a recess 240 in the lever 230. This provides a latch that can hold the brakes in set position but cannot accommodate variations in the required park load.

FIG. 9 shows a development of the arrangement of FIG. 8, wherein a variable position park latch mechanism is provided. The device of FIG. 9 comprises a multi-point latch system that has the ability to set the park load at any one of a number of predetermined park load levels via multi-positional mechanical engagement of a solenoid or other member 244 of a brake. For this purpose, the operating member 244 has a number of recesses 246, selectively engageable by the pivoted latch pin 242 whose angular position is determinable by an actuator 248.

In operation of the embodiment of FIG. 9, in the event that park braking is demanded by operation of the hand control and the lever has been rotated to a parking braking condition, the latch mechanism in the form of the pin 242 is arranged to be displaced anti-clockwise by the actuator 248 to bring the pin 242 into a position behind the lever 244 where it engages one of the recesses 246 to prevent the lever 244 from returning clockwise when the pneumatic actuator is exhausted. The parking brake is thereby held on until the hand control is operated to release the parking braking, at which time the lever 244 is moved slightly anti-clockwise to a level usually at least and possibly slightly more than the load that was required to park the brake to release the contact pressure with the pin 242. The pin 242 is arranged to be displaced to enable normal foot braking to be resumed.

FIG. 10 shows a further development where the surface of a cam member 250 provides a variable backstop for the operating member 252 of the brake, the cam member 250 being driven rotationally by a motor and/or gearbox (not shown). The feature of being able to latch at a variable park load improves over the fixed levels of FIG. 9.

FIG. 11 shows a preferred implementation where the cam of FIG. 10 has been replaced by a wedge 54 which is positioned through use of an electric motor 56, driving through a reduction gearbox 58 onto a lead screw 60 of a linear driver 62 which moves the wedge 54 linearly into and out of the desired park position. The use of a reduction gearbox allows the further use of a low power motor having a compact layout suitable for mounting integrally with the brake. Additionally, the reduction gearbox and lead screw arrangement provide a non-reversible "detent" which holds the wedge in position until further driven by the electric motor.

FIG. 12 shows a simplified arrangement of the implementation shown in detail in FIG. 11 and having a motor-driven wedge 54. Corresponding parts in FIGS. 11 and 12 are numbered the same.

Although not really necessary to an understanding of the present invention, there follows a brief explanation of the disc brake structure of FIG. 11 to which the motor driven wedge has been applied.

The disc brake of FIG. 11 comprises a housing 201 that straddles a disc 202 mounted on an axle of the vehicle to be braked (not shown). The brake is actuated by mechanical movement of an input actuator such as an air cylinder (not shown). Such actuators are well known in the field of brake actuation. The actuator co-operates with the outer end of the operation shaft or "op-shaft" 203 of the brake. The inner end of the op-shaft is carried in a bearing attached to the lower or inner housing part 205. Said inner end of the op-shaft 203 has formed on its outer surface a cam lobe 206 upon which rotation causes a reaction force to be transmitted to rollers 207. The rollers 207 in turn transmit the applied load to a pair of spaced inner tappet members 208. These inner tappet members 208, are screwed into engagement with associated outer tappet members 209 which apply the input load from the actuator to the rear of the inner braking lining 210, thus pressing the friction material of the inner braking lining 210 into frictional engagement between the disc 202. A reaction force is generated through this frictional engagement between the disc 202 and inner braking lining 210, that is fed back through the tappets 208 and 209, rollers 207 and cam lobe 206 which is supported by the inner housing part 205. The inner housing 205 is secured to the outer housing part 211 by bridging bolts 212 and 213. Thus the applied force being generated by movement of the opt-shaft 203 is ultimately transmitted by reaction means to the outer housing part 211 which in turn presses the outer brake lining 214 into frictional engagement with the disc 202. Therefore it will be appreciated that the disc 202, upon movement of the opt-shaft 203, is clamped between inner and outer friction linings 210 and 214 to generate a braking force for braking the vehicle under control of the applied input movement.

Reference is now directed to FIGS. 13 to 15 which show three possible ways of deriving a feedback signal/quantity corresponding to a sensed actuation level being exerted by the brake.

FIG. 13 shows the use of a pressure sensor 310 which provides an electrical output signal representative of the pressure developed inside the brake actuator 127 against the internal brake forces being developed within the brake.

FIG. 14 shows the use of an angular displacement sensor 312 which detects angular displacement of the op-shaft 128 within the brake actuation mechanism.

FIG. 15 shows the use of a force sensor 314, such as a load cell, for detecting the force developed inside the brake.

Reference is now made to FIG. 16 which is a simplified flow diagram showing the sequence steps in the parking brake application procedure. The individual boxes in FIG. 16 are as follows:

316—Start
318—Electrical device (e.g. handle 22) moved to park position
320—Brake applied via ASR pressure source 18 (FIGS. 2, 3) and modulated by the ABS or additional source 32 (FIG. 4) to parking level
322—Feedback signal from brake to initiate latching action
324—Latch moved into place
326—Brakes released via valving
328—Stop Reference is now made to FIG. 17 which is a simplified flow diagram showing the sequence steps in the parking brake release procedure. The individual boxes in FIG. 17 are as follows.

330—Start
332—Electrical device moved to park release position
334—Brake applied to park release level
336—Feedback signal from brake to initiate release of latch
338—Latch moved to removed position
340—Brake pressure released
342—Stop A parking system in accordance with the present invention can give more of the following benefits:

(1) Only single diaphragm actuators are required. Heavier and bulkier brake actuators are not required. This gives cost, weight and space benefits.

(2) On rigid non-towing vehicles, the parking reservoir is eliminated.

(3) The pneumatic hand control valve and its piping is eliminated.

(4) If desired, the four-wheel parking can give a higher level of parking effort than with conventional systems.

(5) There can be a saving in fitting labour at the vehicle builders, due to the reduction in component parts and pipe work.

(6) The control of the braking through the hand control can be more accurate and responsive compared to conventional pneumatically released spring brakes, which tend to suffer from lags and high levels of hysteresis.

(7) The transducers in a graduated hand control are effectively used as demand sensors so that between the brakes off and park positions, the amount of braking can be varied. This is a feature of most of today's pneumatic hand controls. Alternatively, switches could be employed to provide a two-state system.

What is claimed is:

1. A parking braking system in a vehicle not having EBS wherein, for parking braking, wheel brakes are arranged to be supplied with actuating fluid from a pressure source under the control of a manually operated electrical device (22) and wherein, upon selecting parking braking by actuation of the electrical device (22), the brakes are arranged to be applied and mechanically locked or latched in place with a mechanical latch/lock comprising a stop device, which when actuated, moves into a position to mechanically hold the brake in a parking braking condition, irrespective of whether the brake force generated is then reduced.

2. A parking braking system as claimed in claim 1 which is arranged to use a pressure source provided already for traction control for the supply of actuating fluid to apply the parking braking.

3. A parking braking system as claimed in claim 2, having both an anti-lock braking system (ABS) and a traction control system (ASR), wherein the traction control system includes valving (16) that is able to apply the brakes of driven wheels independently of a foot brake control, this being used in conjunction with ABS valves to arrest the motion of a spinning drive axle wheel, whereby it is then possible to drive the vehicle forward via a differential utilizing the non-spinning wheel, such ASR valving (16) being used to apply and regulate the braking for parking.

4. A parking braking system as claimed in claim 1, wherein dedicated valving (30, 34, 36) is provided, together with a suitable pressure source (32a, 32b), to apply the brakes to a desired parking braking level prior to application of the mechanical lock or latch to maintain that parking braking level.

5. A parking braking system as claimed in claim 1 wherein the manually operated electrical device (22) is adapted to generate and transmit to a parking braking ECU (26) and electrical parking braking signal, the brakes being arranged to be mechanically locked or latched via the parking braking ECU in a brakes-applied condition in response to the generation of said electrical parking brake signal.

6. A parking braking system as claimed in claim 5, wherein the manually operated electrical device (22) is a switch or a variable transducer.

7. A parking braking system as claimed in claim 6, wherein the variable transducer is adapted to enable graduated braking to be provided between the brakes-off and park positions.

8. A parking braking system as claimed in claim 1, wherein the manually operated electrical device (22) is adapted to generate and transmit to a vehicle mounted ECU an electrical parking brake signal, the vehicle brakes being arranged to be mechanically locked or latched via said vehicle mounted ECU in a brakes-applied condition in response to the generation of said electrical parking brake signal.

9. A parking braking system as claimed in claim 1, having brake actuators which are arranged to be released once the latch or lock has been actuated to hold the brakes in the brakes-applied condition.

10. A parking braking system as claimed in claim 1, wherein the stop device is a solenoid operated pin (129).

11. A parking braking system as claimed in claim 1, wherein the stop device comprises a pivotable latch (236) which is selectively rotatable by an actuator for single position engagement with an operating or input lever or shaft (230) of the brake to maintain the brake in the parking braking condition.

12. A parking braking system as claimed in claim 1, wherein the stop device is constructed so as to be capable of mechanically holding the brakes in any of a range of park load levels.

13. A parking braking system as claimed in claim 12, wherein the stop device comprises a pivotable latch (242) which is selectively rotatable by an actuator to any of a plurality of engagement positions with an operating or input lever or shaft (244) of the brake to maintain the brake in a selected parking braking condition.

14. A parking braking system as claimed in any of claim 1, wherein in order to enable parking braking to be released, the brake force is arranged to be re-applied up to a level at which the brake latch or lock can be released.

15. A parking braking system in a vehicle not having EBS wherein, for parking braking, wheel brakes are arranged to be supplied with actuating fluid from a pressure source under the control of a manually operated electrical device (22) and wherein, upon selecting parking braking by actuation of the electrical device (22), the brakes are arranged to be applied and mechanically locked or latched in place and wherein following actuation of the manually operable electrical device (22), the initiation of the latching action is provided by a feedback quantity, taken from the sensed actuation level being exerted in the brake, reaching a preset or controlled level.

16. A parking braking system as claimed in claim 15, wherein the feedback quantity is the pressure developed inside the brake actuator against the internal brake forces being developed within the brake.

17. A parking braking system as claimed in claim 15, wherein the feedback quantity is the displacement of a component within the brake actuation mechanism.

18. A parking braking system as claimed in claim 15, wherein the feedback quantity is the force developed inside the brake, measured by a sensor or sensors positioned so as to be subjected to the actuation/clamping stresses within the brake.

19. A parking braking system as claimed in claim 15, wherein, following selection of a parking braking release condition of said manually operated electrical device, initiation of release of the latching action is arranged to be dependent upon the aforementioned feedback quantity.

20. A parking braking system in a vehicle not having EBS wherein, for parking braking, wheel brakes are arranged to be supplied with actuating fluid from a pressure source under the control of a manually operated electrical device (22) and wherein, upon selecting parking braking by actuation of the electrical device (22), the brakes are arranged to be applied and mechanically locked or latched in place with a mechanical latch/lock comprising a stop device which, when actuated, moves into a position to mechanically hold the brake in a parking braking condition, irrespective of whether the brake force generated is then reduced, said stop device being constructed so as to be capable of mechanically holding the brakes in any of a range of park load levels wherein the stop device comprises a rotatable cam (250) which engages an operating or input lever or shaft (252) If the brake for maintaining the brake in a selected parking braking condition.

21. A parking braking system in a vehicle not having EBS wherein, for parking braking, wheel brakes are arranged to be supplied with actuating fluid from a pressure source under the control of a manually operated electrical device (22) and wherein, upon selecting parking braking by actuation of the electrical device (22), the brakes are arranged to be applied and mechanically locked or latched in place with a mechanical latch/lock comprising a stop device which, when actuated, moves into a position to mechanically hold the brake in a parking braking condition, irrespective of whether the brake force generated is then reduced, said stop device being constructed so as to be capable of mechanically holding the brakes in any of a range of park load levels wherein the stop device comprises a wedge (54) which is arranged to be selectively driven by a controlled actuator into engagement with an operating or input lever or shaft (203) of the brake to maintain the brake in a selected parking braking condition.

22. A parking braking system as claimed in claim 21, wherein the controlled actuator is an air cylinder or an electric motor (56).

23. A parking braking system as claimed in claim 21, wherein the wedge (54) is coupled to the electric motor (56) by way of a mechanism which is non-reversible except by reverse driving of the motor.

24. A parking braking system as claimed in claim 23, wherein the non-reversible mechanism is a high reduction gearbox (58,60).

* * * * *